US007958586B1

(12) United States Patent
Carter

(10) Patent No.: US 7,958,586 B1
(45) Date of Patent: Jun. 14, 2011

(54) MULTI TREAD SEGMENTED SELF DEPLOYING ROLL UP RAMP

(76) Inventor: Cynthia D. Carter, Santa Fe, NM (US)

(*) Notice: Subject to any disclaimer, the term of this patent is extended or adjusted under 35 U.S.C. 154(b) by 0 days.

(21) Appl. No.: 12/794,465

(22) Filed: Jun. 4, 2010

Related U.S. Application Data

(60) Provisional application No. 61/184,204, filed on Jun. 4, 2009.

(51) Int. Cl.
*E01D 1/00* (2006.01)
(52) U.S. Cl. .......................... 14/69.5; 119/847; 119/849
(58) Field of Classification Search .................. 14/69.5; 119/847, 849
See application file for complete search history.

(56) References Cited

U.S. PATENT DOCUMENTS

| 288,455 | A | * | 11/1883 | Landes | 182/164 |
|---|---|---|---|---|---|
| 4,024,595 | A | * | 5/1977 | Brown | 14/2.4 |
| 5,791,717 | A | * | 8/1998 | Reich et al. | 296/61 |
| 6,463,613 | B1 | * | 10/2002 | Thompson | 14/69.5 |
| 6,643,878 | B2 | * | 11/2003 | Schmaltz et al. | 14/69.5 |
| 6,928,959 | B1 | * | 8/2005 | Trauernicht et al. | 119/847 |
| 7,082,637 | B1 | * | 8/2006 | Griffin | 14/69.5 |
| 7,192,240 | B2 | * | 3/2007 | Aulicino | 414/537 |
| 7,225,492 | B2 | * | 6/2007 | Pratt | 14/69.5 |
| 7,546,654 | B2 | * | 6/2009 | Carmel | 14/2.4 |

* cited by examiner

Primary Examiner — Gary S Hartmann
(74) Attorney, Agent, or Firm — Todd E. Rinner

(57) ABSTRACT

A roll out multi-tread ramp design supported by its arched design and the preferably identical shape and angle of each of its multiple treads abutting one another creating a surface area that distributes stress from weight placed on the surface of the ramp. Oblong links comprise preferably two holes per link and hold each tread that abut one another together, a cylindrical pin inserts snugly through an end of each ramp tread, passes through the link hole, then preferably re-enters tread of the ramp which connects multiple treads together and creates strength when weight is placed on ramp and allows the ramp to be rolled up. Ramp length is adjustable by using varying numbers of treads in each ramp assembly. An elastic cord runs through all treads to assist with self-deployment of ramp and assists in holding ramp treads in place.

20 Claims, 9 Drawing Sheets

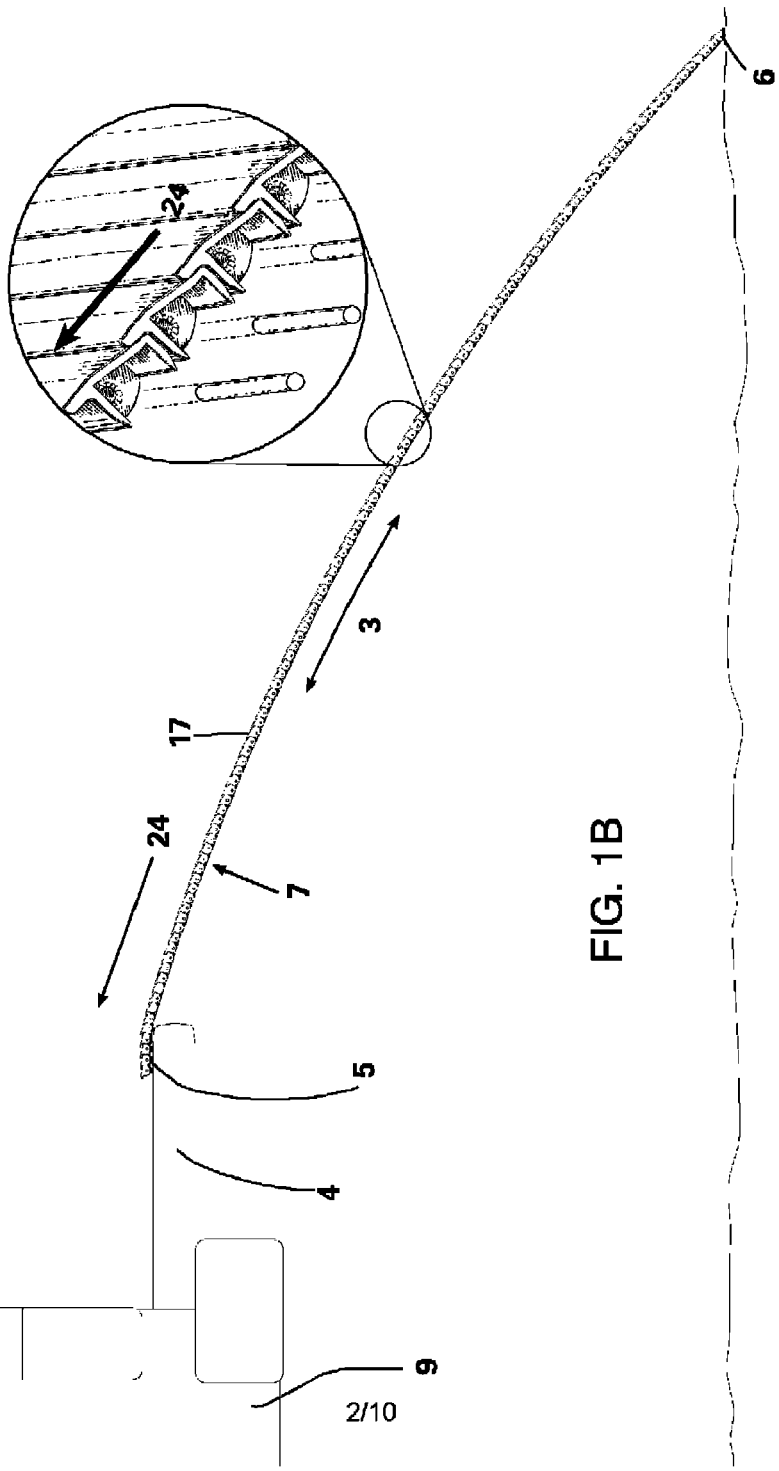

MULTI TREAD SEGMENTED SELF DEPLOYING ROLL UP RAMP

This application claims priority to and the benefit of U.S. Provisional Patent Application Ser. No. 61/184,204, entitled "Multi-Tread Roll Out Arched Dog Ramp," filed on Jun. 4, 2009, the entirety of which is incorporated herein by reference.

There exists the need for a compact, self-deploying ramp which allows for quick and easy deployment by using one hand to deploy, which rolls up and compacts and stores in a very small space, allowing for more room for the animal and additional cargo in the vehicle. Current invention allows an owner to quickly and efficiently deploy a ramp. For example, the owner of an animal can have one hand on the animal while deploying the ramp with the other hand, allowing for one handed deployment and setup.

Some ramps created for the loading and unloading of animals and equipment from vehicles are known. Some of the prior art includes rigid one piece ramps, projected ramps, or two piece unfolding ramps that are heavy, take up much cargo space and prove difficult to use. Many are used for the loading and unloading of animals from vehicles. Long one piece ramps are large and difficult to store because they take up space and are hard to lift and handle because of their weight. Unfolding ramps are also large and heavy and take up much space. There are other ramps in existence, but none have the lightweight and compact design of this self-deploying ramp.

SUMMARY OF THE INVENTION

A roll out multi-tread ramp design supported by its arched design and the preferably identical shape and angle of each of its multiple treads abutting one another creating a surface area that distributes stress from weight placed on the surface of the ramp. Oblong links comprise preferably two holes per link and hold each tread that abut one another together, a cylindrical pin inserts snugly through an end of each ramp tread, passes through the link hole, then preferably re-enters tread of the ramp which connects multiple treads together and creates strength when weight is placed on ramp and allows the ramp to be rolled up. Ramp length is adjustable by using varying numbers of treads in each ramp assembly. An elastic cord runs through all treads to assist with self-deployment of ramp and assists in holding ramp treads in place.

BRIEF DESCRIPTIONS OF DRAWINGS

Figure 1A:
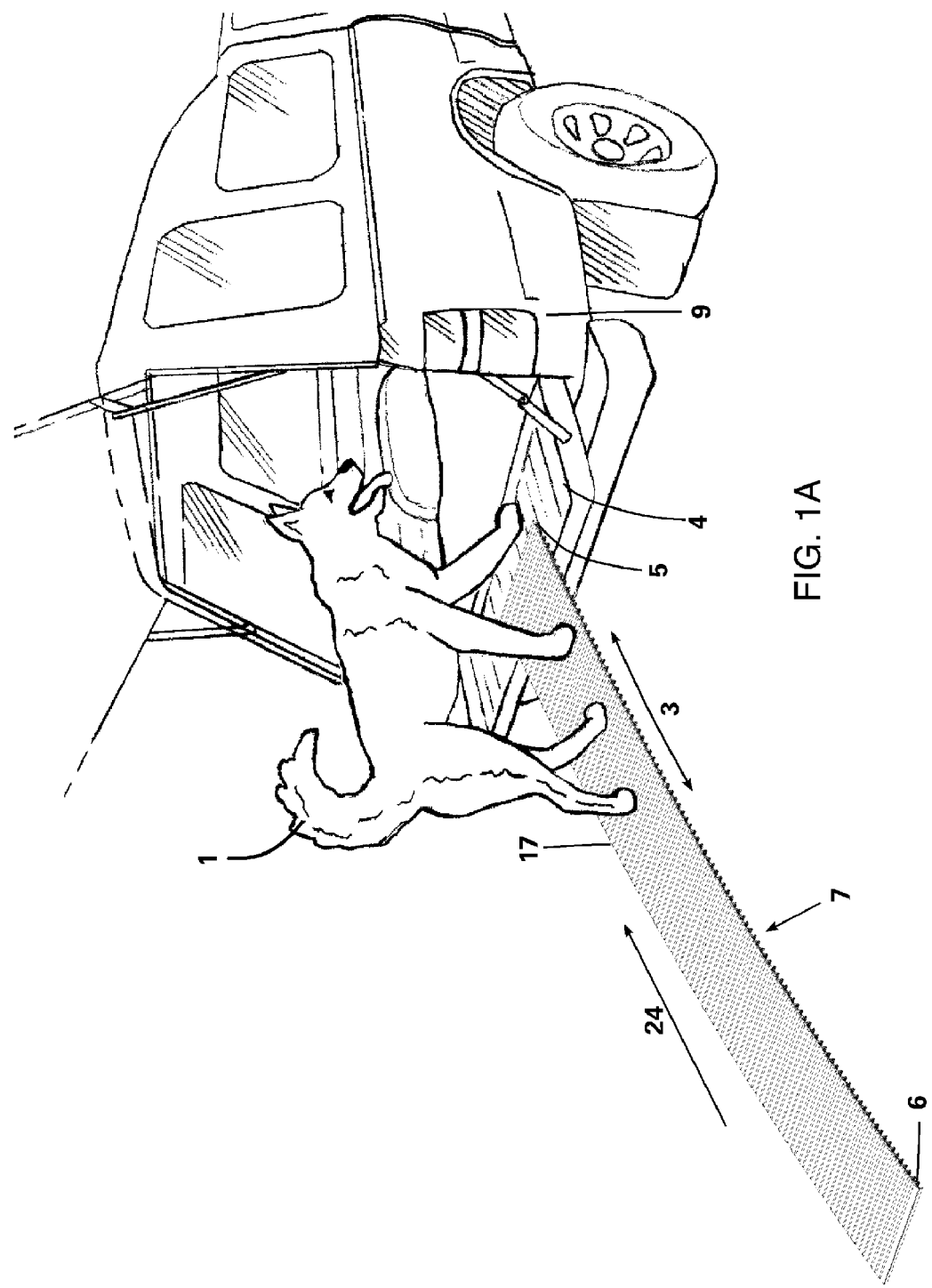
Figure 2A:
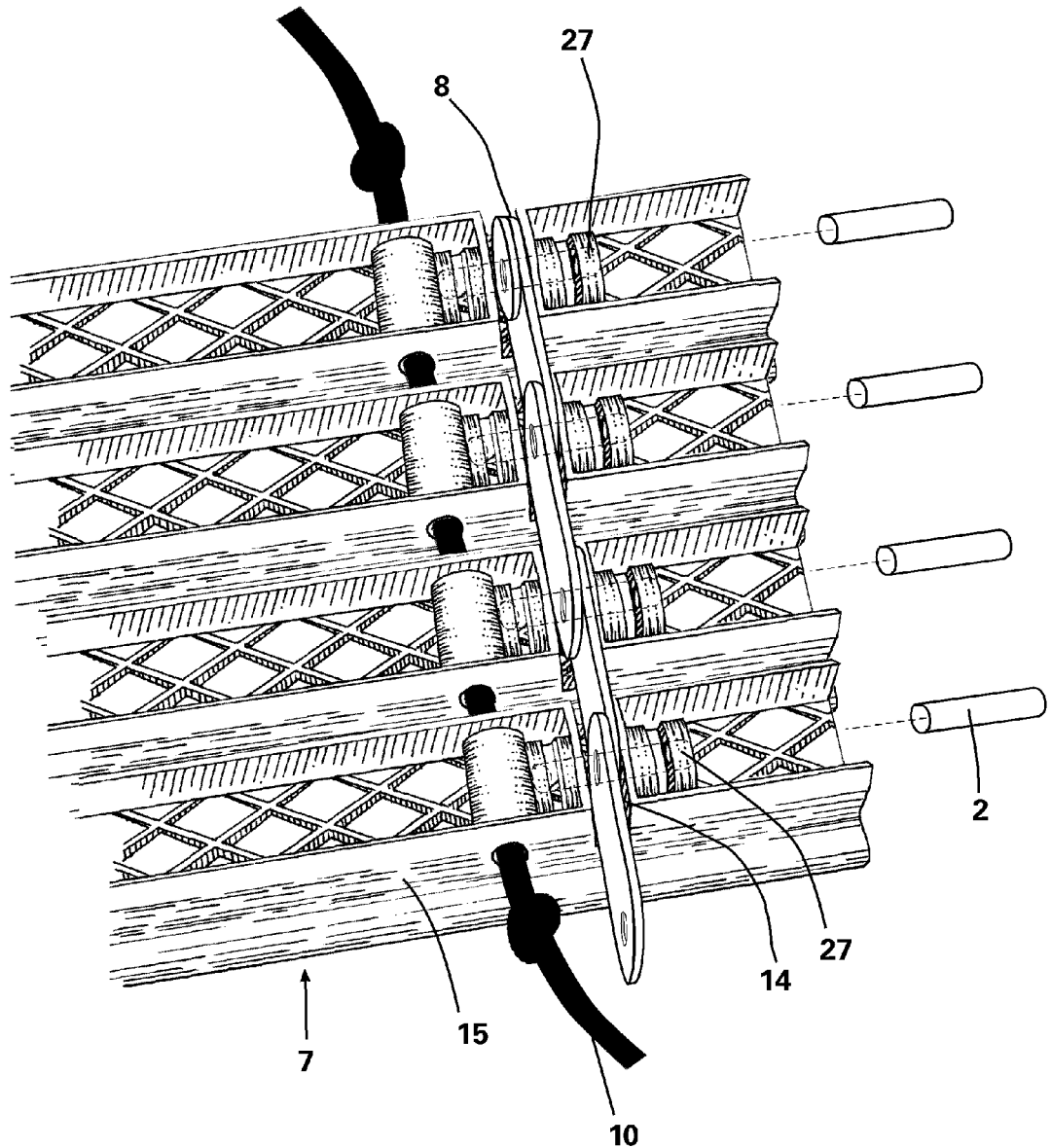
Figure 2B:
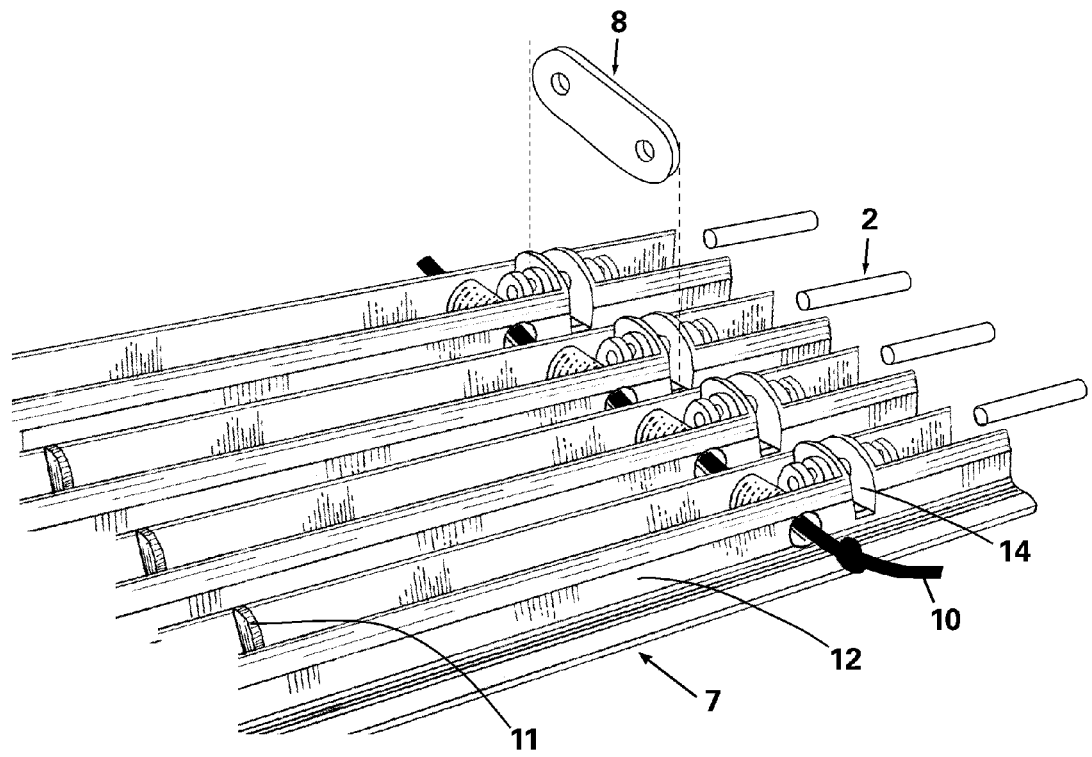
Figure 2C:
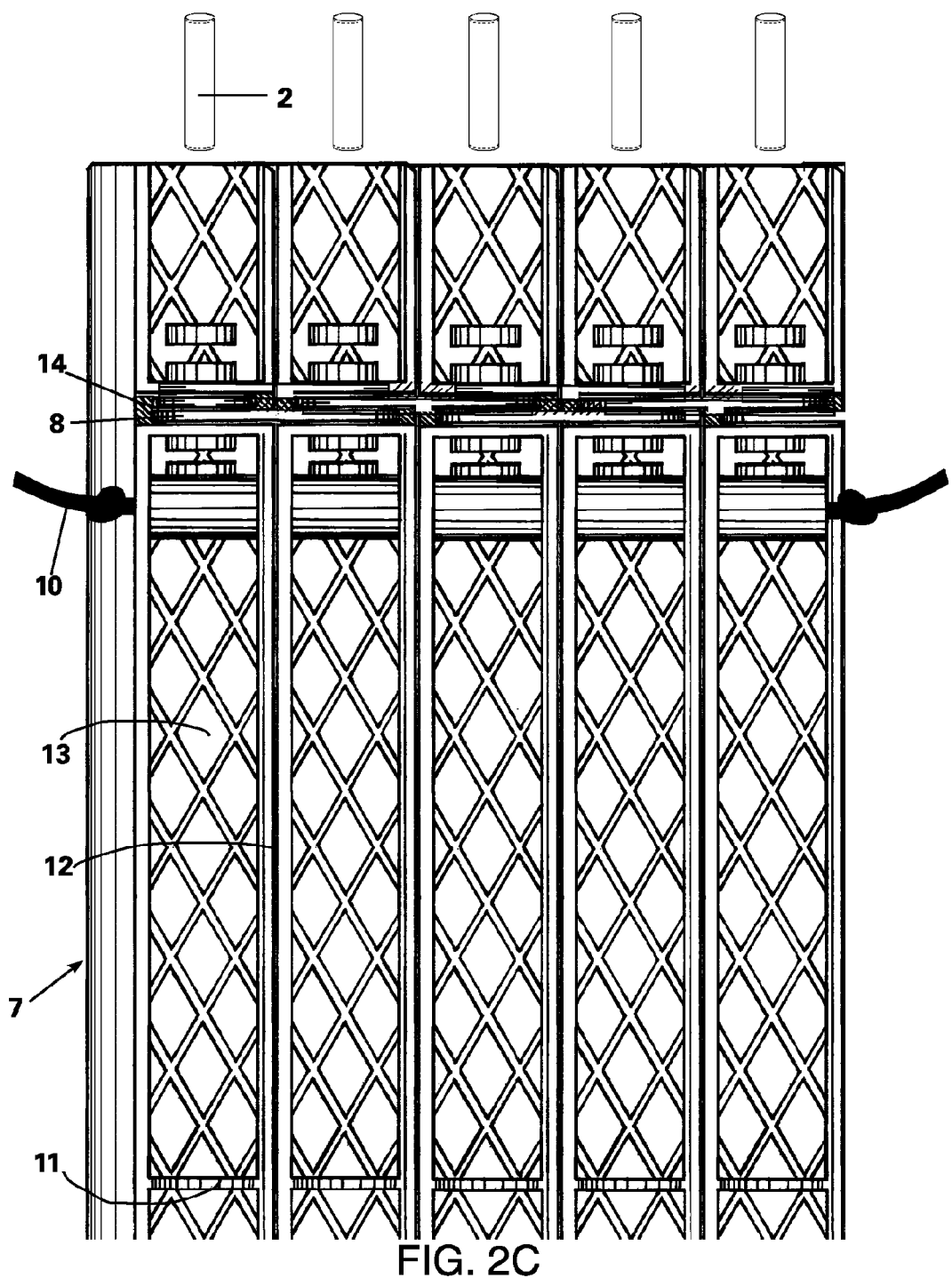
Figure 3:
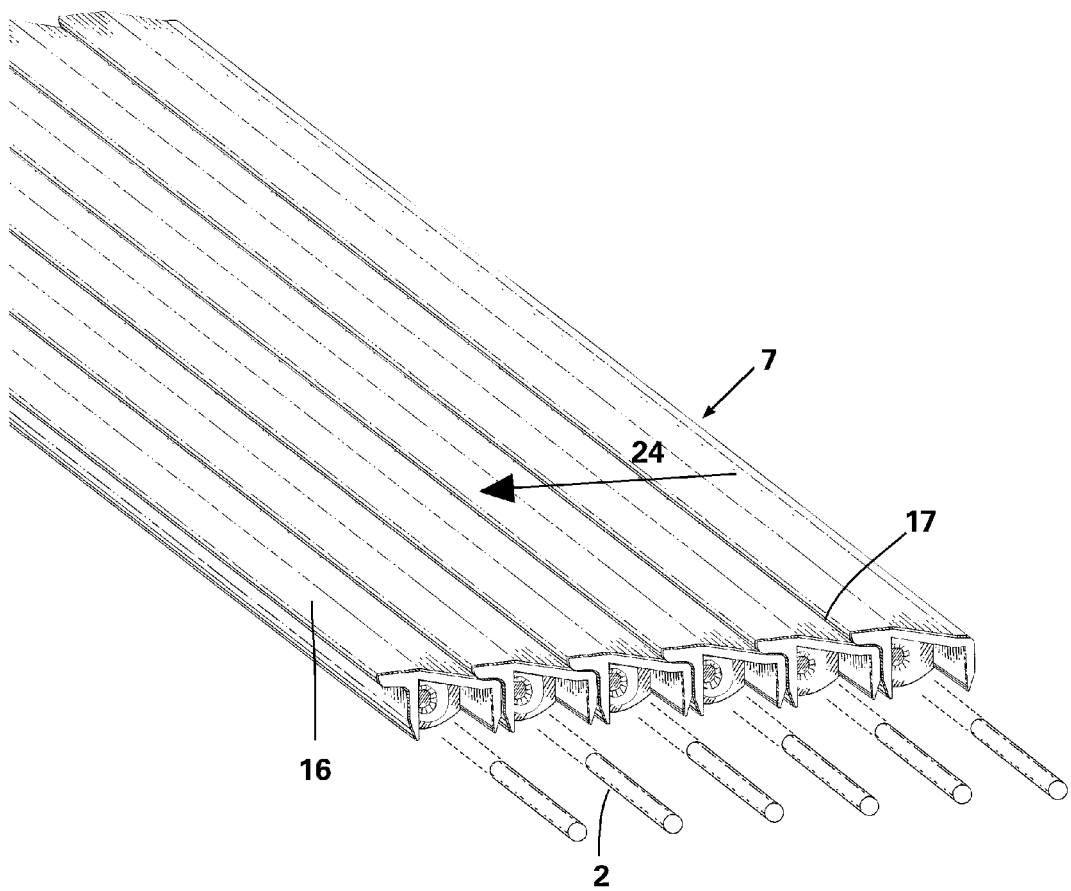
Figure 4A:
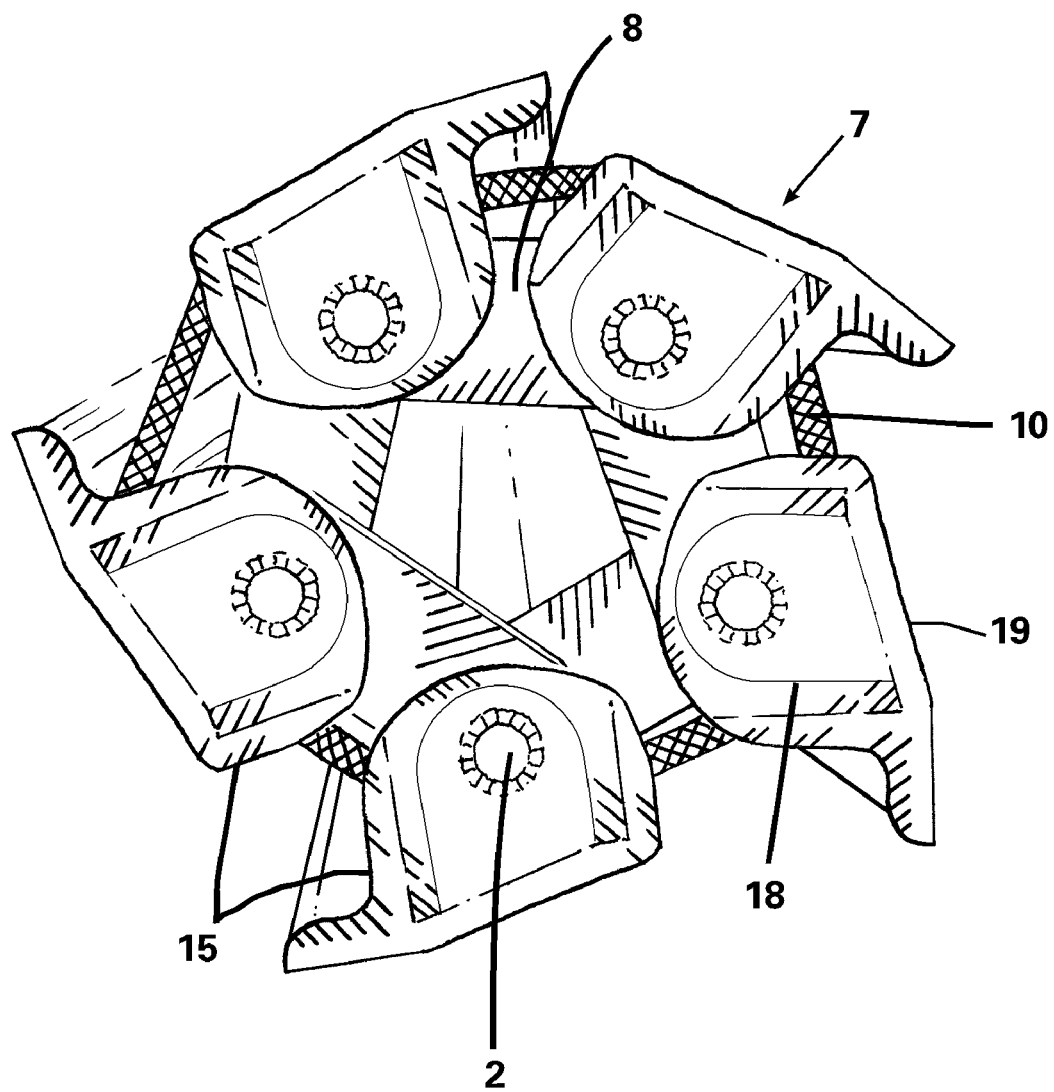

FIG. 1a: A perspective drawing shows ramp deployed and animal being loaded using ramp into a pickup truck
FIG. 1b: Elevation drawing shows side view of ramp when deployed
FIG. 1c: Enlarged exploded view of ramp treads from FIG. 1B
FIG. 2a: Underside perspective view of ramp treads showing how the ramp treads are connected to one another using links and pins (exploded)—one side of ramp shown in this drawing, opposite side exactly same design.
FIG. 2b: Alternative perspective underside view of ramp treads showing how the ramp treads are connected to one another using links and pins (exploded)—one side of ramp shown in this drawing, opposite side exactly same design.
FIG. 2c: Bottom view of treads showing links and elastic cord that runs through ramp treads (with exploded pins).
FIG. 3: Perspective view of ramp treads with pins (exploded) and links
FIG. 4a: End view of several sample ramp treads when rolled up
FIG. 4b: End view of entire ramp when rolled up into storage state
FIG. 5: End of ramp tread side view

LIST OF DRAWING REFERENCES

1 Dog
2 Pins pushed through ends of treads, pass through cylindrical fins to connect adjoining links to connect treads to one another
3 Preferred embodiment of ramp having an arc
4 Tailgate or inside of vehicle
5 Preferred rubber coating or inserts stabilize and protect from scratching
6 Preferred rubber coating or inserts stabilize ramp when sitting on ground
7 Ramp tread, made preferably from glass fiber nylon product
8 Link secured from underneath ramp, and engaged from pins pushed through ends of ramp treads
9 Vehicle
10 Elastic cord runs through all treads which assists in ramp deployment and helps hold the ramp treads in position once unrolled
11 Fins that run perpendicular to treads add strength to ramp
12 Sidewalls run lengthwise along each side of tread
13 Plastic removed from strategic areas that allow the ramp to be lightweight yet do not compromise strength. Elevated diamond pattern preferably added to underside for strength.
14 Slat area created for placement of links that connect adjoining tread pieces of ramp using pins that enter from end of ramp tread
15 Surface area where compression occurs when weight applied to ramp
16 Texture preferably applied to surface of ramp treads
17 Raised edge of treads provide grooves for traction
18 Treads designed so they may be rolled into a tight roll
19 Ramp tread surface
20 Force applied to surface
24 Preferred uphill direction
25 Ramp rolled into cylinder shape
26 Barrel cord locks
27 Cylindrical fins secure pins that slide through and engage links
28 Location of compression
29 Built in storage tether wraps around rolled up ramp when stored

DESCRIPTION OF THE PREFERRED EMBODIMENTS

Figure 4B:
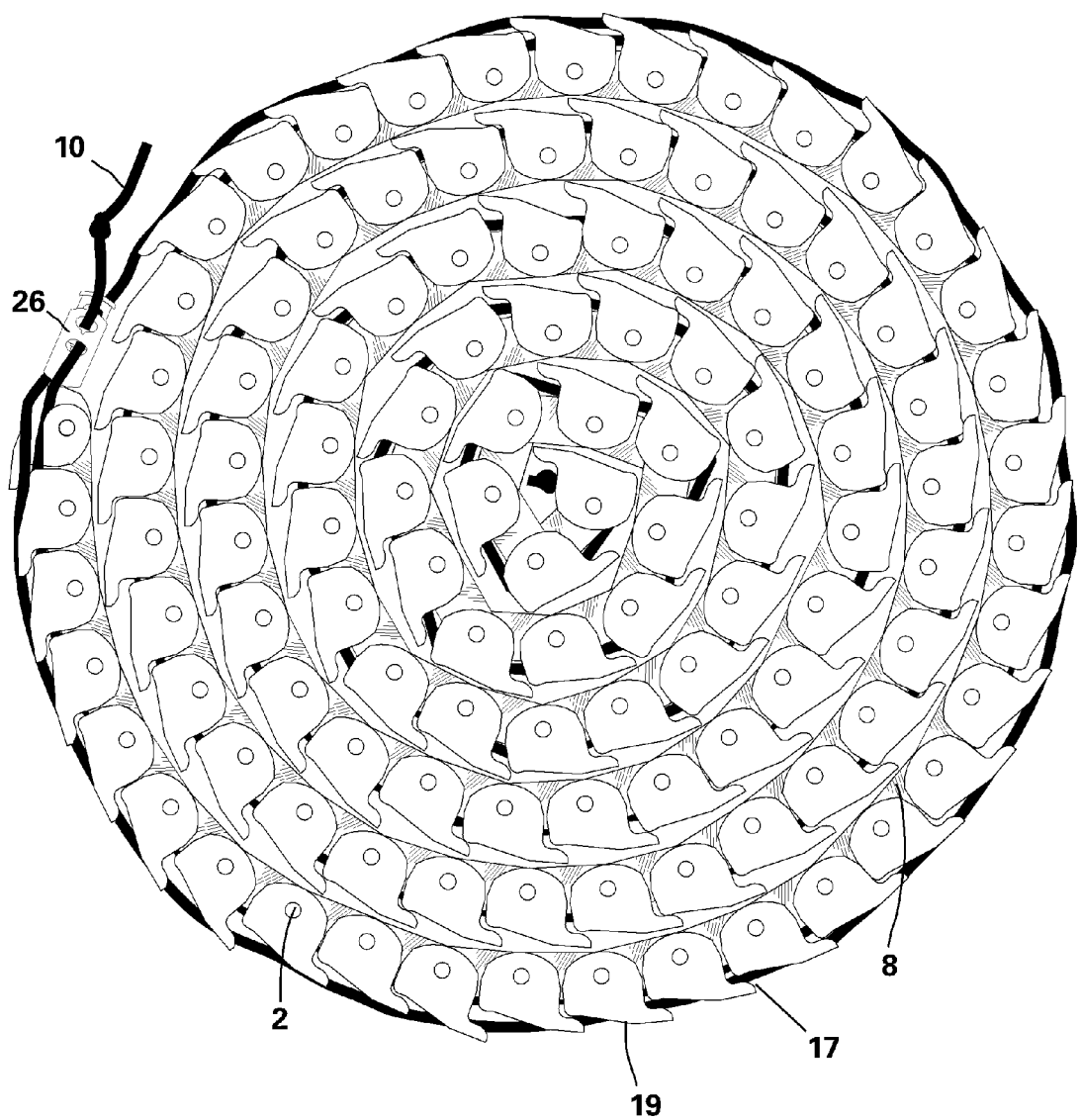
Figure 5:
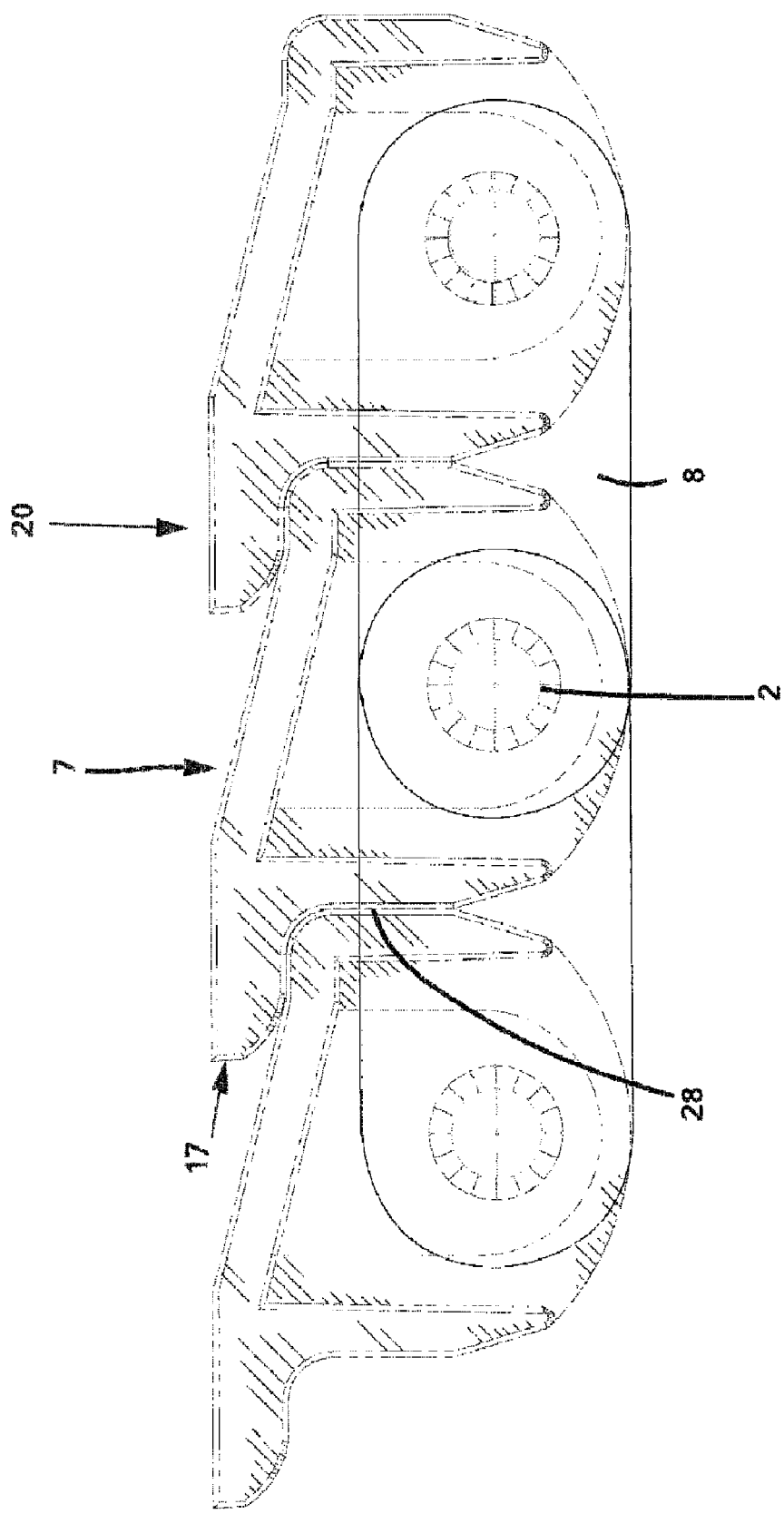

The need for a multi-tread roll out arched animal ramp has been identified because of current animal ramps available are limited to large fold-out ramps and telescoping ramps which are cumbersome, heavy and take up a large amount of space in vehicles 9. The invention of the multi-tread roll out arched ramp was created out of a need for compact, portable, lightweight, roll-up style, strong and quickly deployable ramp (e.g. FIG. 4b) for loading and unloading, for example, animals 1 from vehicles 9. With reference to the drawings, the present invention involves a ramp assembly including aplastic unit called a ramp tread 7 (or ramp unit) which is designed to be duplicated and used in multiples to create each ramp product. These ramp treads 7 are connected together, as depicted, using links 8 and pins 2 (preferably held in place by a press fit) with an elastic cord 10 to assist with deployment or unrolling of ramp. Usage of this ramp includes placement on the back of a truck or SUV or a truck tailgate 4, for example. The roll up design allows for rolling up into a cylinder shape as shown in FIG. 4B.

This ramp tread 7 is shaped so multiple treads abut one another 15 creating a surface area that evenly distributes stress on the ramp across the length of the ramp tread from weight 20 placed on the surface. The preferred overall arc shape 3 of the ramp while using multiple pieces or treads that make up the length of the ramp gives it strength through compression 15 of the multiple treads used together when weight is applied. The length of the ramp can be modified by adding or removing ramp treads 7. As can be seen in the figures, ramp treads 7 have complementary facets allowing them to interface at areas of compression 28 where the treads make contact. Plastic (preferably) sidewalls 12 preferably run lengthwise along the underside of each tread 7 adding stability. In the preferred embodiment, one or more sidewalls 12 are angled to deviate from true perpendicularity to the underside surface, thereby imparting an overall arc to the ramp assembly. In the preferred embodiment, both sidewalls are angled slightly away from the tread edge 17 side of the ramp tread 7 with the sidewall nearest raised tread edge 17 being angled slightly more than the other sidewall (preferably one quarter of a degree greater angling). Alternatively, the sidewall nearest raised tread edge 17 may be angled inwards while the other sidewall remains substantially perpendicular. Utilizing angling of the sidewalls thereby allows an arc to be imparted to the overall ramp assembly (which arc may decrease when the ramp assembly is placed under load). Additionally, sidewalls 12 preferably taper at the end (as depicted), thereby aiding in avoiding pinched fingers when using the ramp assembly and aiding in allowing the ramp assembly to be rolled up such that the sidewall members do not create an interference when rolling up the ramp assembly. The sidewall 12 nearest raised tread edge 17 contains a curved transition from the sidewall to the underside surface of the tread shaped complementary to the curved transition between the top surface of the tread and the other sidewall member. The curved transitions have the same radius of curvature. In one embodiment, the radius of curvature of these curved transitions is on the order of 0.063 inches. Ramp tread 7 also preferably has a curved transition from the underside left of the sidewall nearest raised tread edge 17 leading into raised tread edge 17 (as visible in FIG. 5, among others) thereby aiding in avoiding pinched fingers when using the invention. In one embodiment, the radius of curvature for this transition is 0.13 inches.

Plastic cross piece fins 11 run perpendicular to each tread adding to the strength of the ramp. Ramp treads are optimized using preferably a strong glass filled nylon or polypropylene plastic. Plastic removed from strategic areas that allow the ramp to be as lightweight as possible without compromising strength 13. There is preferably rubber coating or rubber inserts on the underside of the ramp at the top 5 and bottom 6 for vehicle scratch protection, stability and non-slippage. The ramp design requires it be placed in a specific direction for optimal traction and functionality. The ramp treads are designed to offer traction 17 and must be used facing upward 24, with the raised edge 17 facing in an uphill 24 direction. Surface 19 of ramp treads preferably has a texture 16 for added traction.

The links 8 hold the ramp treads 7 together when inserted into a groove created to hold links in place 14 on the bottom side of the ramp treads. A cylindrical pin 2 is inserted into fins with holes in the ramp treads, continue through the slat containing the links, then continue on through the ramp tread, securing each ramp tread to one another. These links provide strength to the ramp when force is applied on the surface 20. When force is applied to the surface of the ramp 20, this force is transferred to the links which pushes in an outward direction 21 on the links thereby reducing the amount of stress received on the ramp tread 7 point of compression 15. When the links have the force pulling them in an outward direction, the cylindrical pins 2 are holding the links in place and are set within a reinforced area of plastic 27.

An elastic cord with tension created by putting a knot at one end, a barrel lock at the other end, runs inside and just below the surface of the ramp treads 10, which applies a little force so that the ramp will semi-automatically unroll itself and help hold the ramp treads in position once unrolled. Once deployed and animal loaded 1, the ramp is flipped over and rolled back up, secured into a tight round bundle. The excess elastic cord with knot at the end uses barrel cord lock 26 to create an elastic cord loop 29 near the end of the ramp to allow cord to wrap around rolled up ramp keeping it from unrolling and secured for storing.

Other advantages to this invention include the ramp may be made to various lengths, depending on the number of treads used, accommodating varying heights of surfaces. Current invention may be used for various applications when materials indicated are revised, and ramp treads may be made thicker and larger in size, including a ramp for loading and unloading various equipment and all terrain vehicles and other ramp needs.

In alternative embodiments, a separate protective piece to be applied to each end of ramp may be a designed clip on or end piece made of ideally but not limited to plastic or rubber in addition to ramp treads, or it may be rubber inserts designed to attach to treads. Materials used may be variations including but not limited to the following: glass filled and non glass filled nylon or polypropylene, plastic, rubber, metal, aluminum, or a combination thereof. References to materials as "plastic", such as done above in reference to sidewalls 12, is only intended to state a preferred embodiment and not to impose any limitations or requirements of being only plastic. Links and pins may be altered in size as necessary depending on the requirements of a given application of the invention, treads may be built thicker, wider and/or with a larger profile for example to accommodate other uses, such as loading and unloading various equipment and all terrain vehicles or larger animals. There may also be additional fins to strengthen the ramp, placed on the underside, for example. Another embodiment may use one or more additional links and pin supports through the middle of the tread in the same manner as depicted at the ends of the treads in the figures. Changes to the pattern or texture of support on the underneath side of the ramp may also be made as dictated by the circumstances of a particular application. There may also be used a wider tread at the top and bottom of the ramp for added stability. In yet another embodiment, a first ramp assembly as described above may be joined to a second ramp assembly via the same described and depicted features used to connect adjacent tread units (ramp units) to create a first ramp assembly.

Whereas the description has shown and described the preferred embodiment of the present invention, it should be apparent to those skilled in the art that various changes may be made in the form of the invention without affecting the scope thereof.

What is claimed:

1. An arched ramp assembly comprising:
   a. A plurality of adjacently positioned ramp units, each having first and second longitudinal sides and first and second lateral ends, each of said ramp units including:
      i. A multi-planar sectioned upper surface having a first section substantially adjacent to said first longitudinal side and substantially horizontal in orientation, and a second section adjacent to said second longitudinal side and extending inwards to meet with said first section, said second section oriented at an angle increasing in elevation from said second longitudinal side to said first section, said first and second sections extending substantially the entire longitudinal length of said ramp unit;
      ii. A lower surface with first and a second sidewall members extending substantially perpendicular from said lower surface, said sidewall members extending longitudinally along said lower surface
      iii. Said first sidewall member set inwards from said first longitudinal side a uniform distance along substantially the entire length of said first sidewall member, said second sidewall member oriented to extend substantially perpendicular to said lower surface along substantially the entire length of said second longitudinal side;
      iv. A first curved transition from said first sidewall member to said lower surface on the side of said first sidewall member nearest said first longitudinal side, and a second curved transition from said second section of said upper surface to said second sidewall member, said first and second curved transitions having substantially the same radius of curvature;
      v. First and second lateral channels formed through said sidewall members from said first sidewall to said second sidewall;
      vi. Support ribs extending substantially perpendicular from said lower surface, said support ribs running laterally across said lower surface on both sides of said first lateral channel and both sides of said second lateral channel, said support ribs connected to said first sidewall member and extending laterally to said second sidewall member;
      vii. A plurality of fins extending substantially perpendicular from said lower surface and oriented parallel to said lateral channels, with at least one fin located on both sides of each lateral channel between said first and second sidewall members;
      viii. a plurality of pin channels wherein one of said plurality of pin channels passes through said fins located on both sides of each lateral channel and said support ribs located on both sides of each lateral channel;
      ix. at least one link comprising two pin apertures formed therethrough with each aperture located substantially at the opposite end of the link from the other aperture, said at least one link positioned within said lateral channels such that said apertures operatively align with said pin channels;
      x. a plurality of hinge pins respectively passing transversely through said pin channels and said pin apertures for permitting connection of said ramp units and rotation of said ramp units with respect to an adjacent one of said ramp units;
      xi. said plurality of adjacent ramp units abutting each other by interfacing said first longitudinal side of a first ramp unit with a second longitudinal side of a second ramp unit and connecting said first and second units with said links and hinge pins, thereby fixedly positioning adjacent contiguous ramp units one to the other such that said first sidewall member of said first ramp unit conformingly presses against said second sidewall member of said second ramp unit, and a portion of said second section of said upper surface of said second ramp unit conformingly presses against a portion of said lower surface of said first ramp unit between said first sidewall member and said first longitudinal side of said first ramp unit such that said first and second curved transitions are located adjacent to each other and substantially conformingly press against each other.

2. The arched ramp assembly of claim 1 wherein each of said ramp units further comprises:
   a. at least one aperture perpendicularly formed through said first and second sidewall members such that an aperture in said first sidewall member aligns with an aperture in said second sidewall member;
   b. a flexible cord passing through said adjacent positioned ramp units via passage through said apertures formed in said sidewall members, said cord fixably positioned relative to the first and last of said adjacent ramp units.

3. The arched ramp assembly of claim 2 wherein each of said ramp units further comprises a rigid tube fixably connected to said lower surface such that said tube aligns with said apertures in said first and second sidewall members and is sized to allow said cord to pass through said tube.

4. The arched ramp assembly of claim 2 wherein a loop is formed at least one end of said cord and fixably positioned relative to said cord in a size allowing said ramp assembly when rolled up to fit within said loop.

5. The arched ramp assembly of claim 2 wherein said cord is in tension when said ramp assembly is positioned such that adjacent ramp units conformingly press against each other.

6. The arched ramp assembly of claim 1 further comprising a plurality of stabilizing fins extending perpendicular from said lower surface and running laterally from said first sidewall member to said second sidewall member.

7. The arched ramp assembly of claim 1 wherein said lower surface further comprises a pattern of stabilizing members extending perpendicular from said lower surface and formed on substantially all of said lower surface.

8. The arched ramp assembly of claim 1 further comprising a rubber surface applied to one or more of said lower surface, first sidewall member, second sidewall member, and support ribs of the first of said adjacent ramp units.

9. The arched ramp assembly of claim 1 wherein either or both of the first and last ramp units of said plurality of adjacently positioned ramp units comprises an upper surface greater in longitudinal length and lateral width than the ramp units positioned between said first and last ramp units.

10. The arched ramp assembly of claim 1 wherein said adjacent ramp units conformingly press against an adjacent ramp unit along substantially the entire longitudinal length of said ramp units' first and second sidewall members and said lower surfaces and second sections of said upper surfaces.

11. The arched ramp assembly of claim 1 wherein one or more of said sidewall members is angled from true perpendicularity to said lower surface.

12. The arched ramp assembly of claim 11 wherein said first sidewall member is angled towards said second sidewall member.

13. The arched ramp assembly of claim 12 wherein said angling is about one quarter of a degree.

14. The arched ramp assembly of claim 11 wherein both of said sidewall members are angled towards said second longitudinal side so as to deviate said sidewall members from being truly perpendicular to said lower surface with said first sidewall member receiving a greater angling than said second sidewall member.

15. The arched ramp assembly of claim 1 wherein one or more of said sidewall members is angled so as to impart an arc in said ramp assembly when said plurality of adjacently placed ramp units are connected and said arched ramp assembly is unrolled.

16. The arched ramp assembly of claim 1 wherein one or more of said first and second sidewall members taper in width as they extend from said lower surface.

17. The arched ramp assembly of claim 16 wherein said first sidewall member is tapered on a side closest to said first longitudinal side of said ramp unit, and said second sidewall member is tapered on a side closest to said second longitudinal side of said ramp unit.

18. The arched ramp assembly of claim 1 wherein said ramp unit further comprises a portion of said lower surface extending substantially horizontally from said first transition towards said first longitudinal side and a third curved transition connects said portion of said lower surface to said first longitudinal side.

19. The arched ramp assembly of claim 1 wherein said third curved transition has a radius of curvature to prevent said curved transition from pressing against said second section of said top surface in a manner that interferes with said first and second curved transitions from being placed adjacent to each other and substantially conformingly pressing against each other.

20. An arched ramp assembly comprising a plurality of adjacently positioned ramp units each having a front and back side, said front and back side each comprising a complementary curved region such that said front and back sides may intermesh with each other by adjoining said complementary curved regions in a close relationship, each of said plurality of adjacently positioned ramp units removably and rotatably connected to an adjoining ramp unit with a front side of one ramp unit intermeshed with a back side of an adjoining ramp unit, said complementary curved regions limiting rotation of said ramp units about each other in one direction; each of said ramp units further comprising:
   (a) a contiguous multi-planar sectioned upper surface oriented such that each section is facing substantially in the vertical direction, said upper surface having a first section substantially adjacent to said front side and substantially horizontal in orientation, and a second section adjacent to said back side and extending inwards towards said first section, said second section oriented at an angle increasing in elevation from said back side towards said first section; and
   (b) a lower surface, said lower surface of one ramp unit pressed against a portion of said second section of said upper surface of an adjoining ramp unit when said front and back sides of adjoining ramp units are intermeshed with each other.

* * * * *